United States Patent [19]

Moroney et al.

[11] Patent Number: 5,054,067
[45] Date of Patent: Oct. 1, 1991

[54] BLOCK-CIPHER CRYPTOGRAPHIC DEVICE BASED UPON A PSEUDORANDOM NONLINEAR SEQUENCE GENERATOR

[75] Inventors: Paul Moroney, Cardiff-By-The-Sea; Christopher J. Bennett, San Diego, both of Calif.

[73] Assignee: General Instrument Corporation, New York, N.Y.

[21] Appl. No.: 482,644

[22] Filed: Feb. 21, 1990

[51] Int. Cl.$^5$ ............................................. H04L 9/06
[52] U.S. Cl. ...................................... 380/37; 380/9; 380/46; 380/50
[58] Field of Search ...................... 364/200, 900, 222.5, 364/224.21, 260.812, 260.9, 286.4, 286.5, 918.7, 943.7, 944.5; 380/9, 29, 30, 37, 46, 49, 50

[56] References Cited

U.S. PATENT DOCUMENTS

| | | | |
|---|---|---|---|
| 4,255,811 | 3/1981 | Adler | 380/37 |
| 4,316,055 | 2/1982 | Feistel | 380/37 |
| 4,663,500 | 5/1987 | Okamoto et al. | 380/50 X |
| 4,890,324 | 12/1989 | Jansen | 380/46 X |

Primary Examiner—Bernarr E. Gregory
Attorney, Agent, or Firm—Edward W. Callan

[57] ABSTRACT

A block-cipher cryptographic device that processes plaintext/encrypted input data with a key signal to provide encrypted/decrypoted output data. Such device includes a shift register for receiving input data; and data processing means for executing the following data processing routine a selected number of cycles to provide output data: processing the contents of said shift register with a key signal to provide initially processed data; initializing a pseudorandom nonlinear sequence generator with the initially processed data; running the pseudorandom nonlinear sequence generator to generate a keystream; segregating portions of the keystream; processing said segregated portions of said keystream with a portion of the data in the shift register to provide a block of processed data; and shifting said block of processed data into the shift register. To further increase the randomness of the pseudorandom keystream generator, and hence the encryption security, the processing means segretates the keystream in accordance with a routine wherein the beginning of said segregated portion is provided at a time related to the beginning of the keystream in response to a duration indication; segregates every nth bit of the keystream from said beginning of said segregated portion for a selected number of segregated bits in response to a frequency indication; and provides said initially processed data by first processing said shift register contents and said key signal and then rotating data produced by said first processing in response to a rotation indication. The duration indication, the frequency indication and the rotation indication are each separately provided for each of the cycles and may be different for each of the cycles.

17 Claims, 2 Drawing Sheets

BLOCK-CIPHER CRYPTOGRAPHIC DEVICE BASED UPON A PSEUDORANDOM NONLINEAR SEQUENCE GENERATOR

BACKGROUND OF THE INVENTION

The present invention generally pertains to block-cipher cryptographic devices.

Block-cipher cryptographic devices based upon the DES (Data Encryption Standard) algorithm are often used when a high degree of encryption security is required. However, at present, encryption/decryption products containing a block-cipher cryptographic device based upon the DES algorithm are restricted from export from the United States of America.

SUMMARY OF THE INVENTION

The present invention provides a block-cipher cryptographic device that is not based upon the DES algorithm, but which is compatible therewith and which provides a sufficiently high degree of encryption security for many applications.

The block-cipher cryptographic device of the present invention is a device that processes plaintext/encrypted input data with a key signal to provide encrypted/decrypted output data. Such device comprises a shift register for receiving input data; and data processing means, including a pseudorandom nonlinear sequence generator for executing the following data processing routine a selected number of cycles to provide output data:

processing the contents of said shift register with a key signal to provide initially processed data;

initializing the pseudorandom nonlinear sequence generator with the initially processed data;

running the pseudorandom nonlinear sequence generator to generate a keystream;

segregating portions of the keystream;

processing said segregated portions of said keystream with a portion of the data in the shift register to provide a block of processed data; and shifting said block of processed data into the shift register.

The degree of security is increased as the selected number of cycles of execution of the data processing routines is increased.

To further increase the randomness of the pseudorandom keystream generator, and hence the security provided by the cryptographic device of the present invention, the data processing routine preferably segregates the keystream in accordance with a routine wherein the beginning of said segregated portion is provided at a time related to the beginning of the keystream from said beginning of said segregated portion for a selected number of segregated bits in response to a frequency indication; and provides said initially processed data by first processing said shift register contents and said key signal and then rotating data produced by said first processing in response to a rotation indication. The duration indication, the frequency indication and the rotation indication are each separately provided for each of the cycles and may be different for each of the cycles.

Additional features of the present invention are described in relation to the description of the preferred embodiment.

DESCRIPTION OF THE PREFERRED EMBODIMENT

Figure 1:
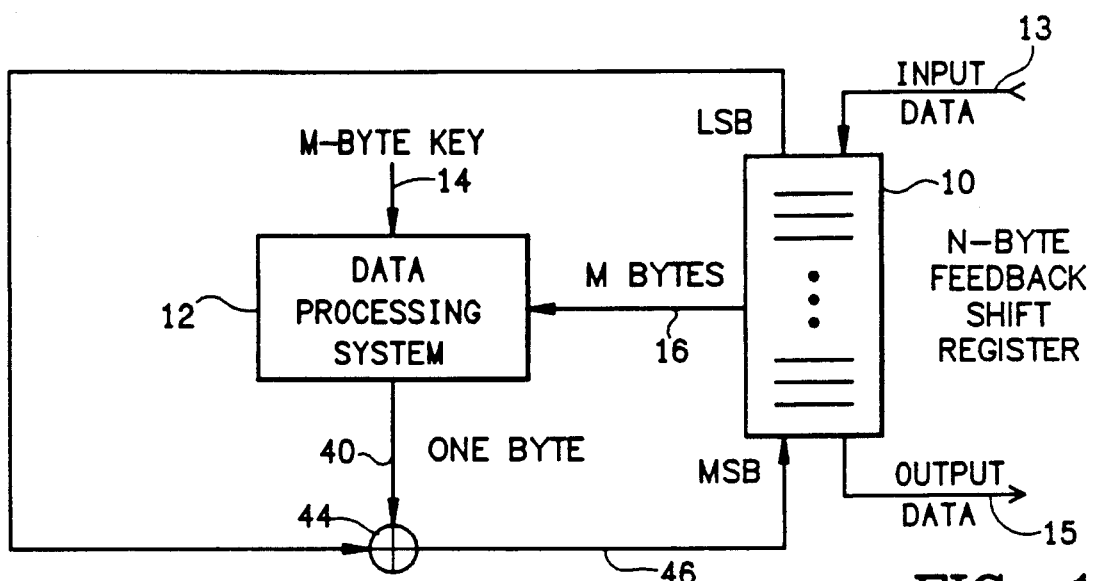
FIG. 1 is a functional block diagram of a block-cipher encryption device according to the present invention.
Figure 1A:
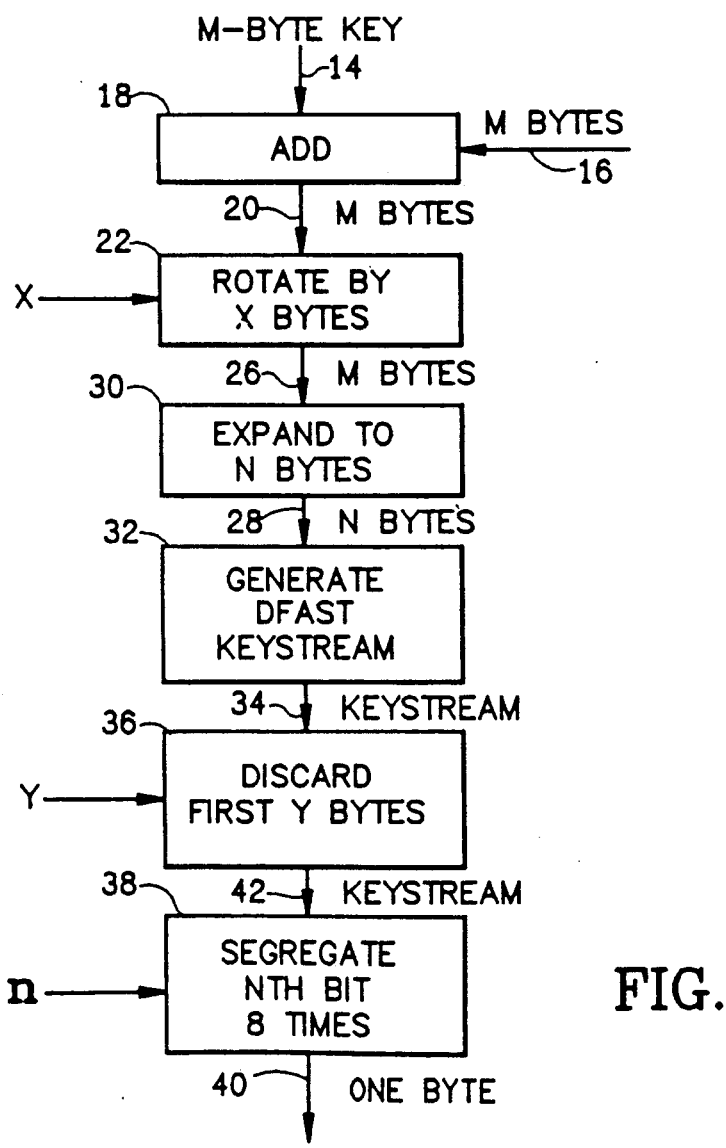
FIG. 1A is a block diagram of data processing routines performed by the data processing system of FIGS. 1 and 3.

Referring to FIGS. 1 and 1A, a preferred embodiment of a block diagram of a block-cipher encryption device according to the present invention includes an N-bit feedback shift register 10 and a data processing system 12. Except as described below, the data processing system is implemented by firmware in a microprocessor.

The block-cipher encryption device of FIG. 1 processes an N-byte block of plaintext input data 13 with an M-byte encryption key 14 signal to provide an N-byte block of encrypted output data 15. In a preferred embodiment that is compatible with a DES encryption device, $M=7$ and $N=8$.

The feedback shift register 10 receives an N-byte block of plaintext input data 13.

The data processing system 12 processes the M most significant bytes 16 of the plaintext input data with the M-byte encryption key 14 by adding the plaintext bytes 16 to the key bytes 14, as illustrated in FIG. 1A by a first data processing routine 18. In alternative embodiments this first routine 18 could be something other than addition, such as subtraction or exclusive ORing (XORing) for example.

The M bytes of data 20 produced by the first routine 18 are then rotated by the data processing system 12 in accordance with a second data processing routine 22 by a number of bytes X in response to a rotation indication X. The relationship of the rotated bytes 26 to the first produced bytes 20 is shown in Table 1 for a rotation indication of three bytes, with $M=7$.

TABLE 1

| BYTES 20 | Btye1 Btye2 Btye3 Btye4 Btye5 Btye6 Btye7 |
|---|---|
| ROTATED BYTES 26 | Btye4 Btye5 Btye6 Btye7 Btye1 Btye2 Btye3 |

The data processing system 12 then expands the rotated M bytes 26 to provide N bytes of initially processed data 28 by executing a data expansion processing routine 30. In the preferred embodiment, wherein $M=7$ and $N=8$, the Nth byte is produced by XORing the M bytes.

The generation of the DFAST keystream 32, included in the data processing system 12 is initialized by the N bytes of initially processed data 28 and is run to generate a keystream 34. In the preferred embodiment the DFAST keystream generation 32 is a dynamic-feedback-arrangement-scrambling-technique which is implemented in hardware to increase the processing speed of the data processing system 12. A DFAST keystream generator is described in U.S. Pat. No. 4,860,353 to David S. Brown. The preferred embodiment of the DFAST keystream generator as described in said patent, includes a dynamic (or nonlinear) feedback shift register and a static (or linear) feedback shift register for receiving input data. The most significant bytes of the N bytes 28 are received in the dynamic feedback shift register and the remaining bytes are received in the static feedback shift register for the DFAST keystream generation 32. The DFAST keystream generation 32 provides high speed pseudorandom nonlinear sequence processing of the N bytes 28 to quickly generate a keystream 34 from which a single byte can readily be segregated to create data that can be fedback for processing in subsequent cycles. In alternative embodiments, other types of pseudorandom nonlinear sequence generation may be used instead of the DFAST keystream generation 32.

The data processing system 12 next executes a discard routine 36 and a segregate routine 38 to segregate portions of the keystream 34 into a single byte 40. The data processing system 12 segregates the keystream 34 in accordance with the discard routine 36 wherein the beginning of the segregated portion of the keystream 42 is provided at a time related to the beginning of the keystream 34 in response to a duration indication Y by discarding the first Y bytes of the keystream 34.

The data processing system 12 further segregates the keystream 42 by segregating every nth bit of the keystream 42 from said beginning of said segregated portion in response to a frequency indication n until eight bits are segregated to form the single byte 40.

Figure 2:
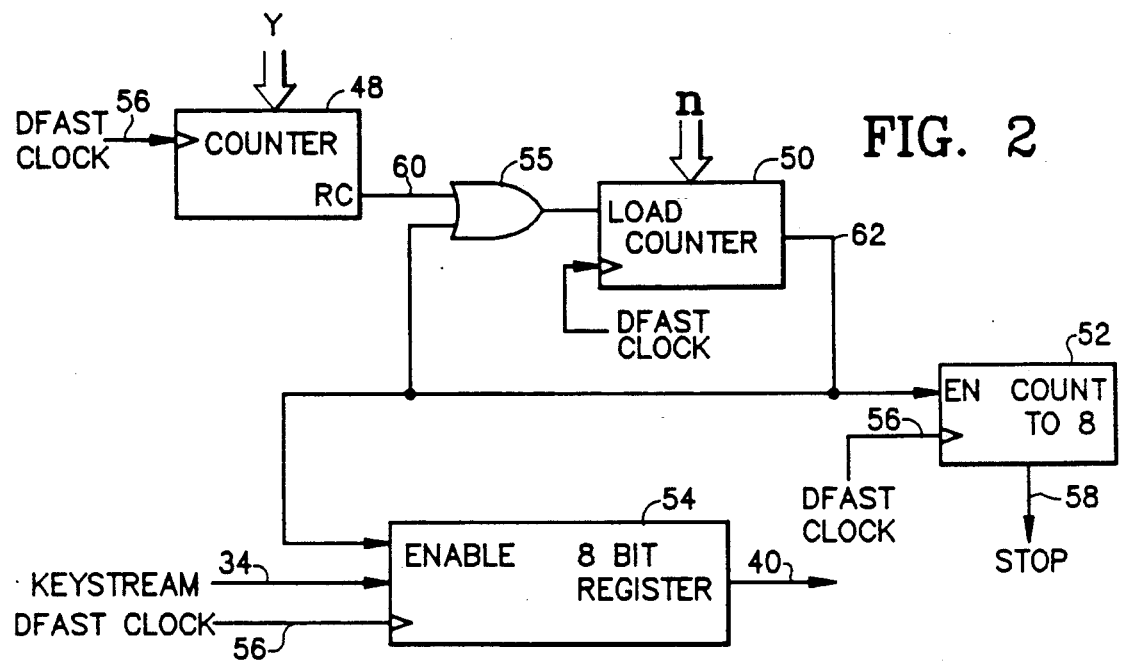
FIG. 2 is a functional block diagram illustrating details of the discard and segregate functions of the encryption device of FIG. 1.

Details of the discard routine 36 and the segregate routine 38 are described with reference to FIG. 2. To execute these routines the data processing system includes and/or implements a duration indication counter 48 a frequency indication counter 50, a bit counter 52, a byte register 54 and an OR gate 55. All three counters 48, 50, 52 are clocked by the same clock signal 56 as clocks the DFAST keystream generation 32. The output of the counter 48 is coupled through the OR gate 55 to the load input of the counter 50. The output of the counter 50 is provided to the enable input of the counter 52 and the enable input of the byte register 54 and is also coupled through the OR gate 55 to the input of the counter 50. The keystream 34 is provided to the data input of the byte register 54.

For each cycle of data processing routines a duration indication Y is loaded into the duration indication counter 48 and a frequency indication n is loaded into the frequency indication counter 50. After the first Y bytes of the keystream 34, a start pulse 60 is delivered by the duration indication counter 48 to the frequency indication counter 50, which in turn delivers an enable pulse to the bit counter 52 and the byte register 54. The byte register is thus enabled to register the concurrent bit of the keystream 34; and the number of bits registered in the byte register 54 is counted by the bit counter 52. The frequency indication counter continues to provide a pulse 62 to the enable inputs of the byte register 54 and the bit counter 52 upon every nth count of clock pulses in the DFAST clock signal 56 until the count in the bit counter 52 reaches eight, whereupon a stop pulse 58 is provided to all three counters 48, 50, 52.

Referring again to block-cipher encrytion device of FIG. 1, the data processing system 12 further executes a routine 44 by which the single byte 40 formed by segregating portions of the keystream 34 is XOR'd with the least significant byte of data in the feedback shift register 10 to provide a byte of processed data 46.

This byte of processed data 46 is shifted into the most significant byte position of the feedback shift register 10 and the data in shift register 10 is shifted such that the least significant byte of data is shifted out of the shift register 10.

This completes one cycle of the data processing routines. The number of cycles to be executed to encrypt a single block of plaintext input data is selected in accordance with the degree of encryption security that is required for the particular application of the encryption device. To ensure that any single bit of the key signal or of the input data can effect every bit of the output data, there should be at least sixteen cycles. Preferably even more cycles are executed to provide still additional security, with the number of cycles being limited by the processing speed of the data processing system 12 in relation to the frequency at which the plaintext input data is provided to the encryption device for encryption.

For each cycle of data processing routines, the rotation indication X, the duration indication Y and the frequency indication n are separately provided. Thus, each of these indications may be different in each of the different cycles.

In the preferred embodiment the selected number of cycles and the rotation indication X, the duration indication Y and the frequency indication n for the respective different cycles are preset in the firmware of the microprocessor. In alternative embodiments, the selected number of cycles, and/or the rotation indication X, the duration indication Y and/or the frequency indication n for the respective different cycles are provided as variable inputs to the microprocessor.

After completing the selected number of cycles of processing the encrypted output data 15 is provided from the feedback shift register 10.

In alternative embodiments, the encrypted output data can be provided by passing the bytes of processed data 46 to a separate component (not shown) apart from the feedback shift register 10.

Figure 3:
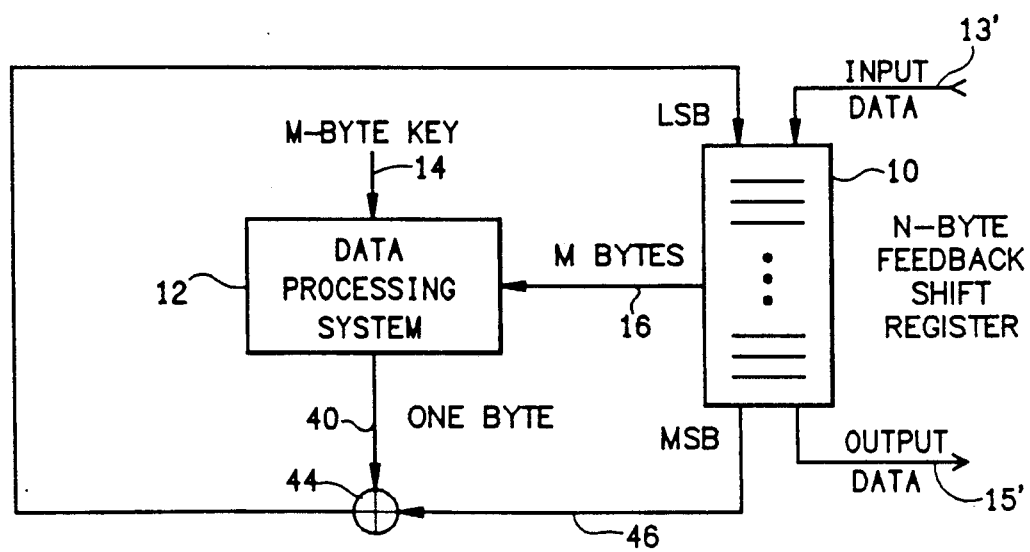
FIG. 3 is a functional block diagram of a block-cipher decryption device according to the present invention.

Referring to FIG. 3, a preferred embodiment of a block diagram of a block-cipher decryption device according to the present invention is identical to the block-cipher encryption device described above with reference to FIGS. 1 and 2, with the following exceptions.

The block-cipher decryption device of FIG. 3 processes an N-byte block of encrypted input data 13' with an M-byte decryption key 14 signal to provide an N-byte block of decrypted output data 15'.

The feedback shift register 10 receives an N-byte block of encrypted input data 13'.

In the data processing routine 44 the single byte 40 formed by segregating portions of the keystream 34 is XOR'd with the most significant byte of data in the feedback shift register 10 to provide the byte of processed data 46; and this byte of processed data 46 is shifted into the least significant byte position of the shift register 10, whereby the data in shift register 10 is shifted such that the most significant byte of data is shifted out of the shift register 10.

The block-cipher decryption device of FIG. 3 decrypts encrypted data provided by the block-cipher encryption device of FIG. 1 to convert such encrypted data into the plaintext data encrypted by the block-cipher encryption device of FIG. 1.

We claim:

1. A block-cipher cryptographic device for processing plain-text or encrypted input data with a key signal to provide encrypted or decrypted output data respectively, comprising
 a shift register for receiving the input data; and
 data processing means, including a pseudorandom nonlinear sequence generator, for executing a data processing routine for a selected number of cycles to provide the output data, wherein the data processing routine includes:
  processing the contents of said shift register with a key signal to provide initially processed data;
  initializing the pseudorandom nonlinear sequence generator with the initially processed data;
  running the pseudorandom nonlinear sequence generator to generate a keystream;
  segregating portions of the keystream;
  processing said segregated portions of said keystream with a portion of the data in the shift register to provide a block of processed data; and
  shifting said block of processed data into the shift register.

2. A device according to claim 1, wherein the data processing means provide said output data in the shift register by said shifting of said blocks of processed data into the shift register for said selected number of cycles.

3. A device according to claim 1, wherein the data processing routine includes segregating a portion of said keystream in accordance with a routine that begins said segregated portion at a time indicated by a duration indication that is separately provided for each of the cycles and may be different for each of the cycles.

4. A device according to claim 3, wherein the routine for segregating said portion of said keystream includes providing said segregated portion by segregating every nth bit of the keystream from said beginning of said segregated portion for a selected number of segregated bits in response to a frequency indication that is separately provided for each of the cycles and may be different for each of the cycles.

5. A device according to claim 4, wherein the data processing means includes means for providing said initially processed data by first processing said shift register contents and said key signal and then rotating data produced by said first processing in response to a rotation indication that is separately provided for each of the cycles and may be different for each of the cycles.

6. A device according to claim 5, wherein the data processing means includes a dynamic-feedback-arrangement-scrambling-technique keystream generator for generating said keystream.

7. A device according to claim 4, wherein the data processing means includes a dynamic-feedback-arrangement-scrambling-technique keystream generator for generating said keystream.

8. A device according to claim 3, wherein the data processing means includes means for providing said initially processed data by first processing said shift register contents and said key signal and then rotating data produced by said first processing in response to a rotation indication that is separately provided for each of the cycles and may be different for each of the cycles.

9. A device according to claim 8, wherein the data processing means includes a dynamic-feedback-arrangement-scrambling-technique keystream generator for generating said keystream.

10. A device according to claim 3, wherein the data processing means includes a dynamic-feedback-arrangement-scrambling-technique keystream generator for generating said keystream.

11. A device according to claim 1, wherein the data processing routine includes segregating a portion of said keystream by segregating every nth bit of the keystream from a beginning of said segregated portion for a selected number of segregated bits in response to a frequency indication that is separately provided for each of the cycles and may be different for each of the cycles.

12. A device according to claim 11, wherein the data processing means includes means for providing said initially processed data by first processing said shift register contents and said key signal and then rotating data produced by said first processing in response to a rotation indication that is separately provided for each of the cycles and may be different for each of the cycles.

13. A device according to claim 12, wherein the data processing means includes a dynamic-feedback-arrangement-scrambling-technique keystream generator for generating said keystream.

14. A device according to claim 11, wherein the data processing means includes a dynamic-feedback-arrangement-scrambling-technique keystream generator for generating said keystream.

15. A device according to claim 1, wherein the data processing means includes means for providing said initially processed data by first processing said shift register contents and said key signal and then rotating data produced by said first processing in response to a rotation indication that is separately provided for each of the cycles and may be different for each of the cycles.

16. A device according to claim 15, wherein the data processing means includes a dynamic-feedback-arrangement-scrambling-technique keystream generator for generating said keystream.

17. A device according to claim 1, wherein the data processing means includes a dynamic-feedback-arrangement-scrambling-technique keystream generator for generating said keystream.

* * * * *

UNITED STATES PATENT AND TRADEMARK OFFICE
CERTIFICATE OF CORRECTION

PATENT NO. : 5,054,067

DATED : October 1, 1991

INVENTOR(S) : Paul Moroney, et al

It is certified that error appears in the above-identified patent and that said Letters Patent is hereby corrected as shown below:

On the title page, in item [75] Inventors: add --Daniel Ray Kindred, San Diego, California--.

Column 1, line 56, after "keystream", insert --in response to a duration indication; segregates every nth bit of the keystream--.

Signed and Sealed this

Twenty-seventh Day of October, 1992

Attest:

DOUGLAS B. COMER

*Attesting Officer*     *Acting Commissioner of Patents and Trademarks*